(12) United States Patent
Jeong

(10) Patent No.: US 12,009,533 B2
(45) Date of Patent: Jun. 11, 2024

(54) CAP ASSEMBLY, SECONDARY BATTERY AND METHOD FOR MANUFACTURING THE SAME, AND BATTERY PACK

(71) Applicant: LG Chem, Ltd., Seoul (KR)

(72) Inventor: An Soo Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 663 days.

(21) Appl. No.: 17/265,721

(22) PCT Filed: Nov. 20, 2019

(86) PCT No.: PCT/KR2019/015947
§ 371 (c)(1),
(2) Date: Feb. 3, 2021

(87) PCT Pub. No.: WO2020/111646
PCT Pub. Date: Jun. 4, 2020

(65) Prior Publication Data
US 2021/0296724 A1 Sep. 23, 2021

(30) Foreign Application Priority Data

Nov. 28, 2018 (KR) .......................... 10-2018-0149368

(51) Int. Cl.
*H01M 50/166* (2021.01)
*H01M 10/0587* (2010.01)
(Continued)

(52) U.S. Cl.
CPC ..... *H01M 50/166* (2021.01); *H01M 10/0587* (2013.01); *H01M 50/107* (2021.01);
(Continued)

(58) Field of Classification Search
None
See application file for complete search history.

(56) References Cited

U.S. PATENT DOCUMENTS 7,910,239 B2   3/2011   Kim et al.
8,703,330 B2   4/2014   Phillips et al.
(Continued)

FOREIGN PATENT DOCUMENTS

CN   102082244 A   6/2011
CN   102122702 A   7/2011
(Continued)

OTHER PUBLICATIONS

Extended European Search Report for EP Application No. 19888849.7 dated Aug. 23, 2021, 2 pgs.
(Continued)

*Primary Examiner* — Robert S Carrico
(74) *Attorney, Agent, or Firm* — Lerner David LLP

(57) ABSTRACT

The present invention relates to a secondary battery. The secondary battery includes a can configured to accommodate an electrode assembly; and a cap assembly bonded to an opening of the can. The cap assembly includes an upper cap provided in the opening and connected to an electrode tab of the electrode assembly and a lower cap configured to bond the upper cap to the opening. The lower cap includes a first bonding part bonded to a bottom surface of the upper cap to support the upper cap and a second bonding part formed on an outer circumferential surface of the first bonding part to fix the upper cap while being bonded to the upper cap.

15 Claims, 6 Drawing Sheets

(51) Int. Cl.
*H01M 50/107* (2021.01)
*H01M 50/147* (2021.01)
*H01M 50/152* (2021.01)
*H01M 50/159* (2021.01)
*H01M 50/16* (2021.01)
*H01M 50/164* (2021.01)
*H01M 50/171* (2021.01)
*H01M 50/179* (2021.01)
*H01M 50/213* (2021.01)
*H01M 50/531* (2021.01)
*H01M 50/533* (2021.01)
*H01M 50/559* (2021.01)

(52) U.S. Cl.
CPC ....... *H01M 50/147* (2021.01); *H01M 50/152* (2021.01); *H01M 50/159* (2021.01); *H01M 50/16* (2021.01); *H01M 50/164* (2021.01); *H01M 50/171* (2021.01); *H01M 50/179* (2021.01); *H01M 50/213* (2021.01); *H01M 50/531* (2021.01); *H01M 50/533* (2021.01); *H01M 50/559* (2021.01)

(56) References Cited

U.S. PATENT DOCUMENTS

| | | | |
|---|---|---|---|
| 10,340,489 | B2 | 7/2019 | Ko et al. |
| 2006/0024573 | A1 | 2/2006 | Yim et al. |
| 2006/0240317 | A1* | 10/2006 | Phillips ............... H01M 50/534 |
| | | | 429/233 |
| 2008/0026286 | A1 | 1/2008 | Cui et al. |
| 2008/0070098 | A1 | 3/2008 | Ray, et al. |
| 2010/0247992 | A1 | 9/2010 | Miyata et al. |
| 2011/0171507 | A1* | 7/2011 | Kim .................. H01M 10/0431 |
| | | | 429/185 |
| 2017/0035284 | A1 | 2/2017 | Fadel |
| 2017/0309879 | A1 | 10/2017 | Ko et al. |
| 2017/0352845 | A1 | 12/2017 | Li et al. |

FOREIGN PATENT DOCUMENTS

| | | |
|---|---|---|
| CN | 106025114 A | 10/2016 |
| CN | 107305964 A | 10/2017 |
| EP | 3255704 A1 | 12/2017 |
| JP | 2005285637 A | 10/2005 |
| JP | 2006012829 A | 1/2006 |
| JP | 2006313649 A | 11/2006 |
| JP | 2008539559 A | 11/2008 |
| JP | 2009545852 A | 12/2009 |
| JP | 2012124008 A | 6/2012 |
| KR | 20060086125 A | 7/2006 |
| KR | 20100076003 A | 7/2010 |
| KR | 20120052035 A | 5/2012 |
| KR | 20130025198 A | 3/2013 |
| KR | 101249919 B1 | 4/2013 |
| KR | 20140106326 A | 9/2014 |
| KR | 20150051516 A | 5/2015 |
| KR | 20160074963 A | 6/2016 |
| KR | 20160088585 A | 7/2016 |
| KR | 20170063128 A | 6/2017 |
| KR | 20180080528 A | 7/2018 |
| KR | 20180082776 A | 7/2018 |

OTHER PUBLICATIONS

Search Report dated May 30, 2022 from the Office Action for Chinese Application No. 201980031985.5 dated Jun. 6, 2022, pp. 1-3.

Search report from International Application No. PCT/KR2019/015947, dated Mar. 2, 2020.

* cited by examiner

CAP ASSEMBLY, SECONDARY BATTERY AND METHOD FOR MANUFACTURING THE SAME, AND BATTERY PACK

CROSS-REFERENCE TO RELATED APPLICATION

The present application is a national phase entry under 35 U.S.C. § 371 of PCT/KR2019/015947, filed on Nov. 20, 2019, and claims the benefit of the priority of Korean Patent Application No. 10-2018-0149368, filed on Nov. 28, 2018, which are hereby incorporated by reference in their entirety.

TECHNICAL FIELD

The present invention relates to a cap assembly, a secondary battery and a method for manufacturing the same, and a battery pack, and more particularly, to a cap assembly having a simplified structure, a secondary battery comprising the same, a method for manufacturing the secondary battery, and a battery pack.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The can type secondary battery comprises an electrode assembly in which electrodes and separators are alternately stacked to be wound in the form of a roll, a can in which the electrode assembly is accommodated, and a cap assembly mounted on an opening of the can. Also, the cap assembly comprises a top cap, a safety vent, a safety element, and a gasket.

Here, in the secondary battery, an upper end of the opening of the can is crimped to fix the cap assembly, thereby increasing in fixing force of the cap assembly.

However, the secondary battery has a problem in which the structure is complicated because the number of components of the cap assembly is large, thereby increasing in manufacturing cost. Particularly, the secondary battery has a problem in that work efficiency is deteriorated due to the process of crimping the upper end of the opening of the can.

DISCLOSURE OF THE INVENTION

Technical Problem

The present invention has been invented to solve the above problems, and an object of the present invention is to provide a cap assembly that is simplified in structure to reduce manufacturing cost, and in particular, when the cap assembly is bonded to the can, a crimping process is omitted to improve manufacturing efficiency, a secondary battery comprising the same, a method for manufacturing the secondary battery, and a battery pack.

Technical Solution

A secondary battery according to a first embodiment of the present invention for achieving the above object comprises: a can configured to accommodate an electrode assembly; and a cap assembly bonded to an opening of the can, wherein the cap assembly comprises: an upper cap provided in the opening and connected to an electrode tab of the electrode assembly; and a lower cap configured to bond the upper cap to the opening, wherein the lower cap comprises:

a first bonding part bonded to a bottom surface of the upper cap to support the upper cap; and a second bonding part formed on an outer circumferential surface of the first bonding part to fix the upper cap while being bonded to the upper cap.

The second bonding part may extend in a direction of the upper cap to surround an outer circumferential surface of the upper cap.

The first bonding part may be melted to seal a portion between the upper cap and the first bonding part.

The second bonding part may be melted to seal a portion between the upper cap and the second bonding part or a portion between the second bonding part and the opening.

The first bonding part may be provided with a through-hole through which an electrode tan of the electrode assembly passes.

The bonding groove may be provided in the outer circumferential surface of the upper cap, and a bonding protrusion to be bonded to the bonding groove may be formed on an inner circumferential surface of the second bonding part.

The bonding groove may have a ring shape along the outer circumferential surface of the upper cap, and the bonding protrusion may have a ring shape on the inner circumferential surface of the second bonding part so as to be bonded to the bonding groove having the ring shape.

The lower cap may further comprise a third bonding part provided on a top surface of the second bonding part and bonded to an upper end of the opening.

The third bonding part may have a ring shape along an outer circumferential surface of the second bonding part so as to be bonded to the entire upper end of the opening.

A method for manufacturing a secondary battery according to a first embodiment of the present invention comprises: a cap assembly manufacturing step (S10) comprising an upper cap manufacturing process (S11) of manufacturing an upper cap and a lower cap manufacturing process (S12) of manufacturing a lower cap, which is provided with a first bonding part supporting a bottom surface of the upper cap and a second bonding part formed on an outer circumferential surface of the first bonding part to surround an outer circumferential surface of the upper cap; an electrode assembly accommodation step (S20) in which an electrode tab of the electrode assembly is connected to the upper cap by passing through the lower cap of the cap assembly to accommodate the electrode assembly in a can; a cap assembly insertion step (S30) of inserting the cap assembly into an opening of the can; and a cap assembly bonding step (S40) comprising a primary bonding process in which an outer circumferential surface of the opening of the can is heated, and the second bonding part of the lower cap supported on the opening is melted to bond the cap assembly to the opening.

The cap assembly bonding step (S40) may further comprise, after the primary bonding process (S41), a secondary bonding process (S42) comprising a process in which the upper cap is further heated, and the first bonding part of the lower cap supported on the upper cap is melted to bond the upper cap to the lower cap and a process in which the second bonding part of the lower is melted to bond the upper cap to the second bonding part.

In the lower cap manufacturing process (S12), a third bonding part provided on a top surface of the second bonding part and bonded to an upper end of the opening may be further formed, and the third bonding part may be bonded to the opening while being melted by heat applied to the can during the primary bonding process (S41).

In the upper cap manufacturing process (S11), a bonding groove may be further formed in an outer circumferential surface of the upper cap is further formed, and in the lower cap manufacturing process (S12), a bonding protrusion may be further formed on an inner circumferential surface of the second bonding part so as to be bonded to the bonding groove.

In the lower cap manufacturing process (S12), a through-hole through which the electrode tab of the electrode assembly passes may be further formed in the first bonding part.

A cap assembly bonded to an opening of a can in which an electrode assembly is accommodated according to a second embodiment of the present invention comprises: an upper cap provided in the opening and connected to an electrode tab of the electrode assembly; and a lower cap configured to bond the upper cap to the opening, wherein the lower cap comprises: a first bonding part bonded to a bottom surface of the upper cap to support the upper cap; and a second bonding part formed on an outer circumferential surface of the first bonding part to fix the upper cap while being bonded to the upper cap.

A battery pack comprises a secondary battery provided with a can configured to accommodate an electrode assembly and a cap assembly bonded to an opening of the can according to a third embodiment of the present invention, wherein the cap assembly comprises: an upper cap provided in the opening and connected to an electrode tab of the electrode assembly; and a lower cap configured to bond the upper cap to the opening, wherein the lower cap comprises: a first bonding part bonded to a bottom surface of the upper cap to support the upper cap; and a second bonding part formed on an outer circumferential surface of the first bonding part to fix the upper cap while being bonded to the upper cap.

Advantageous Effects

The secondary battery according to the present invention may comprise the cap assembly comprising the upper cap and the lower cap. Therefore, the cap assembly may be simplified in structure, and thus, the manufacturing cost of the cap assembly may be reduced. Particularly, since there is no need to crimp the can, the work efficiency may be improved.

MODE FOR CARRYING OUT THE INVENTION

Figure 1:
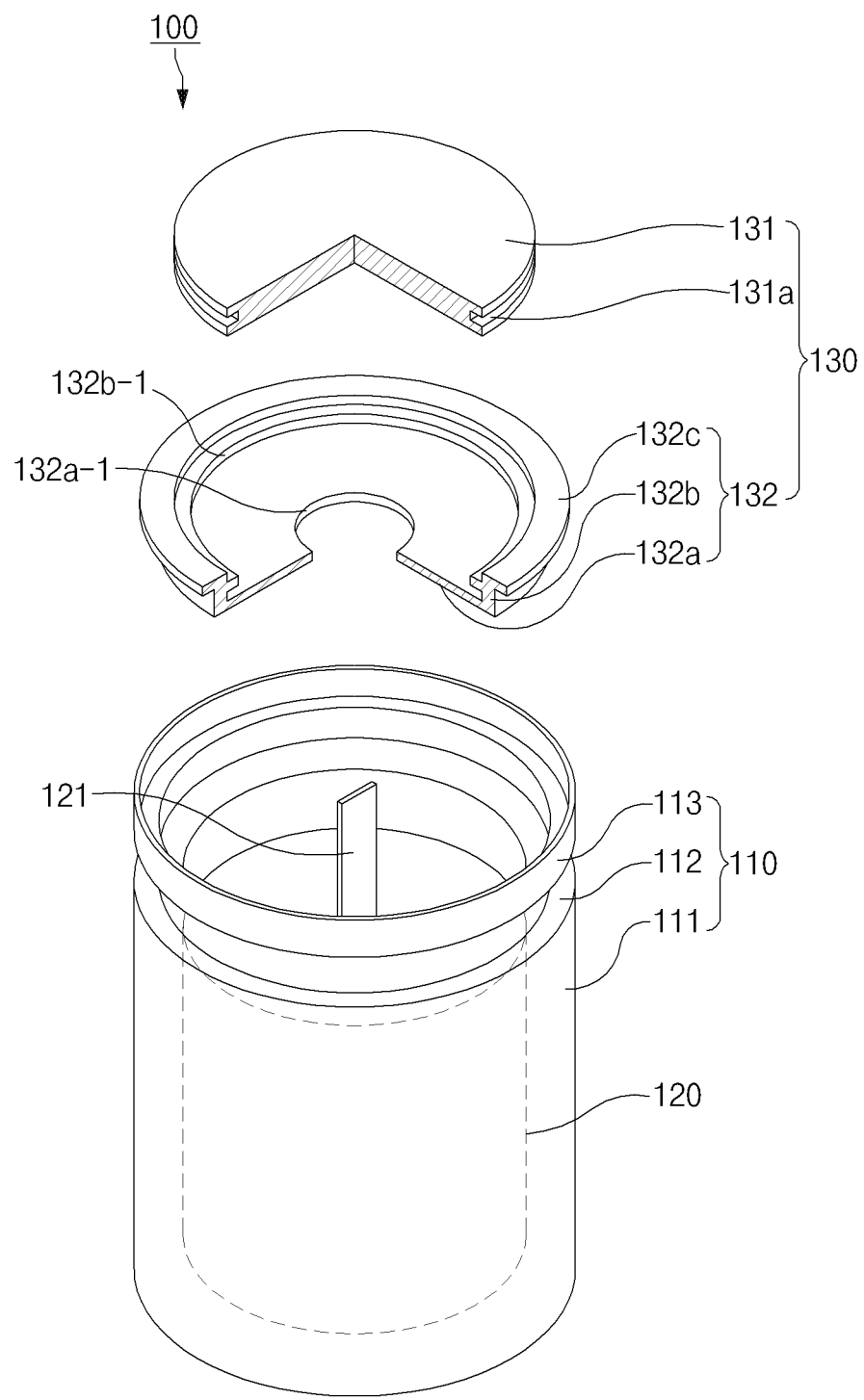
FIG. 1 is an exploded perspective view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment of the Present Invention]

Figure 2:
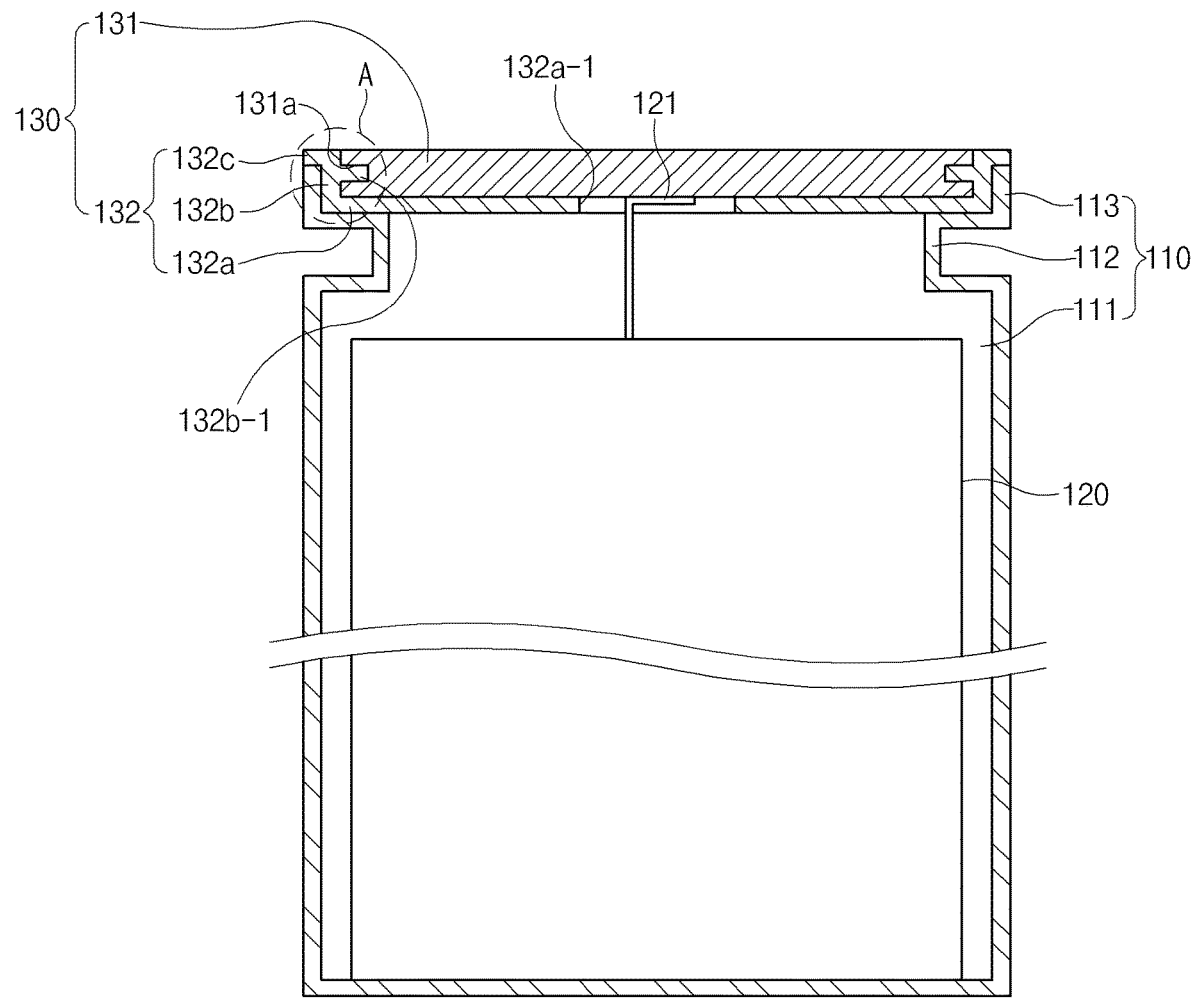
FIG. 2 is a cross-sectional view of the secondary battery according to the first embodiment of the present invention.

As illustrated in FIGS. 1 and 2, a secondary battery 100 according to a first embodiment of the present invention comprises a can 110 that accommodates an electrode assembly 120 and a cap assembly 130 bonded to an opening of the can 110.

Can

The can 110 is configured to accommodate the electrode assembly and comprises an accommodation part 111 that stores the electrode assembly 120, a beading part 112 that supports the cap assembly 130, and an opening 113 that is a passage through which the electrode assembly 120 is accommodated. That is, referring to FIG. 1, a structure, in which the accommodation part 111, the beading part 112, and the opening 113 are connected to each other in sequence upward from a lower side, is provided.

Electrode Assembly

The electrode assembly 120 has a structure in which a plurality of electrodes and a plurality of separators are alternately stacked. The plurality of electrodes comprise a plurality of electrode tabs, and one electrode tab 121 of the plurality of electrode tabs is connected to the cap assembly 130.

Cap Assembly

The cap assembly comprises an upper cap 131 provided in the opening 113 of the can 110 and connected to the electrode tab 121 of the electrode assembly 120 and a lower cap 132 that couples the upper cap 131 to the opening 113.

The upper cap 131 is connected to the electrode tab and closes the opening of the can. The upper cap 131 is made of a conductive metal material and has a plate shape having a predetermined thickness. Particularly, the upper cap 131 may have a size greater than a thickness of an outer wall of the can 110. As a result, when heat and a pressure are applied to the can 110, the upper cap 131 may be prevented from being deformed.

The lower cap 132 is configured to fix the upper cap to the can and simultaneously seal a portion between the upper cap and the can. The lower cap 132 comprises a first bonding part 132a supporting the upper cap 131 while being bonded to a bottom surface of the upper cap 131 and a second bonding part 132b provided on an outer circumferential surface of the first bonding part 132a to fix the upper cap 131 to the can 10 while being bonded to the can 110. Here, the lower cap 132 is made of a synthetic resin that has insulation and sealing properties and is melted by heat.

Referring to FIG. 2, the first bonding part 132a is provided between the upper cap 131 and the beading part 112 and has a plate shape similar to the upper cap 131.

Figure 3:
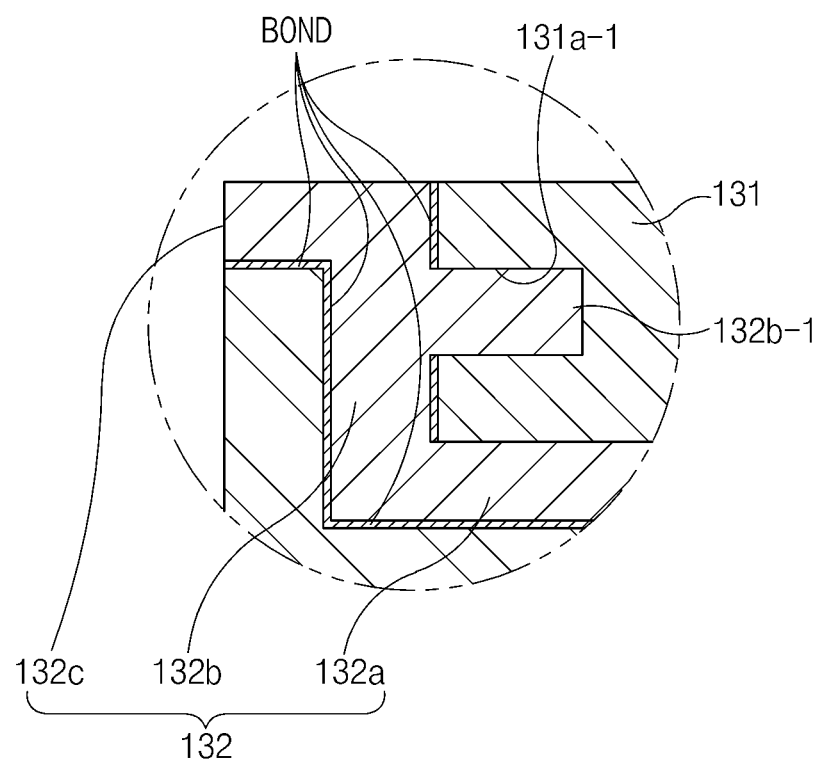
FIG. 3 is an enlarged view of a portion 'A' illustrated in FIG. 2.

Here, the first bonding part 132a and the upper cap 131, which are in close contact with each other, may be integrally bonded to each other as illustrated in FIG. 3. That is, a top surface of the first bonding part 132a may be bonded to the upper cap 131 while being melted by heat. Thus, the bonding force and sealing force between the first bonding part 132a and the upper cap 131 may increase.

Also, a through-hole 132a-1 is defined in the top surface of the first bonding part 132a so that the electrode tab 121 of the electrode assembly 120 passes through the through-hole 132a-1. Thus, the electrode tab 121 may be easily bonded to the upper cap 131 through the through-hole 132a-1.

The first bonding part 132a and the beading part 112, which are in close contact with each other, may be integrally bonded to each other as illustrated in FIG. 3. That is, a bottom surface of the first bonding part 132a may be bonded to the beading part 112 while being melted by heat. Thus, the bonding force and sealing force between the first bonding part 132a and the beading part 112 may increase.

The second bonding part 132b may extend in a direction of the top surface of the upper cap 131 to surround the upper cap 131. Thus, the bonding force and adhesion force between the second bonding part 132b and the upper cap 131 may increase. Particularly, when the second bonding part 132b extends, the bonding force and the adhesion force between the second bonding part 132b and the can 110 may increase.

The second bonding part 132b and the upper cap 131, which are in close contact with each other, may be integrally bonded to each other as illustrated in FIG. 3. That is, an inner circumferential surface of the second bonding part 132b may be bonded to an outer circumferential surface of the upper cap 131 while being melted by heat. Thus, bonding force and sealing force between the second bonding part 132b and the upper cap 131 may increase.

Also, the outer circumferential surface of the second bonding part 132b and the opening 113, which are in close contact with each other, may be integrally bonded to each other. That is, an outer circumferential surface of the second bonding part 132b may be bonded to the opening 113 while being melted by heat. Thus, the bonding force and sealing force between the second bonding part 132b and the opening 113 may increase.

An inner circumferential surface of the opening 113 which is in close contact with the second bonding portion 132b may have an uneven surface having a zigzag shape. Thus, the molten second bonding part 132b and the uneven surface may be bonded in a zigzag shape, and thus, the bonding force between the second bonding part 132b and the opening 113 may increase.

The lower cap 132 having the above-described configuration may stably fix the upper cap 131 to the opening 113 of the can 110.

The lower cap 132 further comprises a third bonding part 132c to increase in fixing force of the upper cap 131. The third bonding part 132c extends from a top surface of the second bonding part 132b in a direction of the opening 113 and then is bonded to an upper end of the opening 113.

That is, the third bonding part 132c may be bonded to the opening 113 to prevent the lower cap 132 from being inserted into the can 110, thereby increasing in fixing force of the cap assembly 130. Particularly, the third bonding part 132c may prevent the upper cap 131 and the can 110 from being in contact with each other to significantly improve an insulating property.

As illustrated in FIG. 3, the third bonding part 132c and the opening 113 may be integrally bonded to each other. That is, the third bonding part 132c may be bonded to the opening 113 while being melted by heat, thereby increasing in bonding force and sealing force.

The third bonding part 132c is formed in a ring shape along the outer circumferential surface of the second bonding part 132b to significantly increase in sealing force between the third bonding part 132c and the opening 113. Particularly, since the lower cap 132 comprises the third bonding part 132c, the lower cap 132 may be fixed to the opening 113 of the can 110 even without the beading part 112 of the can 110. Thus, when the can 110 is manufactured, the beading part 112 may be removed to increase in capacity of the battery, and also, to improve easy of manufacturing and reduce manufacturing costs.

The lower cap 132 has a predetermined melting temperature, and the melting temperature has a start temperature at which melting of the lower cap 132 starts and a final temperature at which the lower cap is completely melted. That is, the lower cap 132 may be heated to the starting temperature to increase in bonding force by melting a portion of surfaces of the first bonding part 132a, the second bonding part 132b, and the third bonding part 132c. Here, when the lower cap 132 is heated up to the final temperature due to the generation of high-temperature heat inside the can 110, the first bonding part 132a, the second bonding part 132b, and the third bonding part of the lower cap 132 may be completely melted to be removed to form gaps between the first bonding part 132a and the upper cap 131 and between the second bonding part 132b and the can 110. Thus, the high-temperature heat generated in the can 110 may be released through the gaps to prevent the secondary battery from being exploded or ignited.

Here, the start temperature may range of 80° C. to 110° C., and the final temperature may range of 130° C. to 150° C.

The cap assembly 130 having the above-described configuration is characterized by comprising the upper cap 131 and the lower cap 132. Therefore, the structure of the cap assembly 130 may be significantly simplified to significantly reduce the cost, and particularly, the cap assembly may be bonded to the can without the crimping process of bending the can, thereby improving work efficiency. The lower cap 132 may have the insulating property to stably insulate the upper cap 131 and the can 110 from each other. As a result, it is not necessary to provide a separate insulator. Therefore, the structure of the cap assembly may be simplified to reduce the cost and improve the easy of manufacturing.

The cap assembly 130 has a structure for improving the bonding between the upper cap 131 and the lower cap 132. That is, a bonding groove 131a is provided in an outer circumferential surface of the upper cap 131, and a bonding protrusion 132b-1 that is bonded to the bonding groove 131a is provided in an inner circumferential surface of the second bonding part 132b. That is, the bonding protrusion 132b-1 may be bonded to the bonding groove 131a to improve bondability between the upper cap 131 and the lower cap 132, and particularly, improve sealability between the upper cap 131 and the lower cap 132.

The bonding groove 131a is formed in a ring shape along the outer circumferential surface of the upper cap 131, and the bonding protrusion 132b-1 is formed in a ring shape on the inner circumferential surface of the second bonding part 132b so as to be bonded to the bonding groove 131a having the ring shape. Accordingly, the bonding protrusion 132b-1 may significantly increase in bonding force and sealing force of the bonding groove 131a.

Therefore, the secondary battery 100 according to the first embodiment of the present invention may comprise the cap assembly 130 provided with the upper cap 131 and the lower cap 132 to simplify the cap assembly, and particularly, reduce the manufacturing cost and improve the manufacturing efficiency without crimping the can.

Hereinafter, a method for the secondary battery 100 according to the first embodiment of the present invention will be described.

[Method for Manufacturing Secondary Battery According to First Embodiment of the Present Invention]

Figure 4:
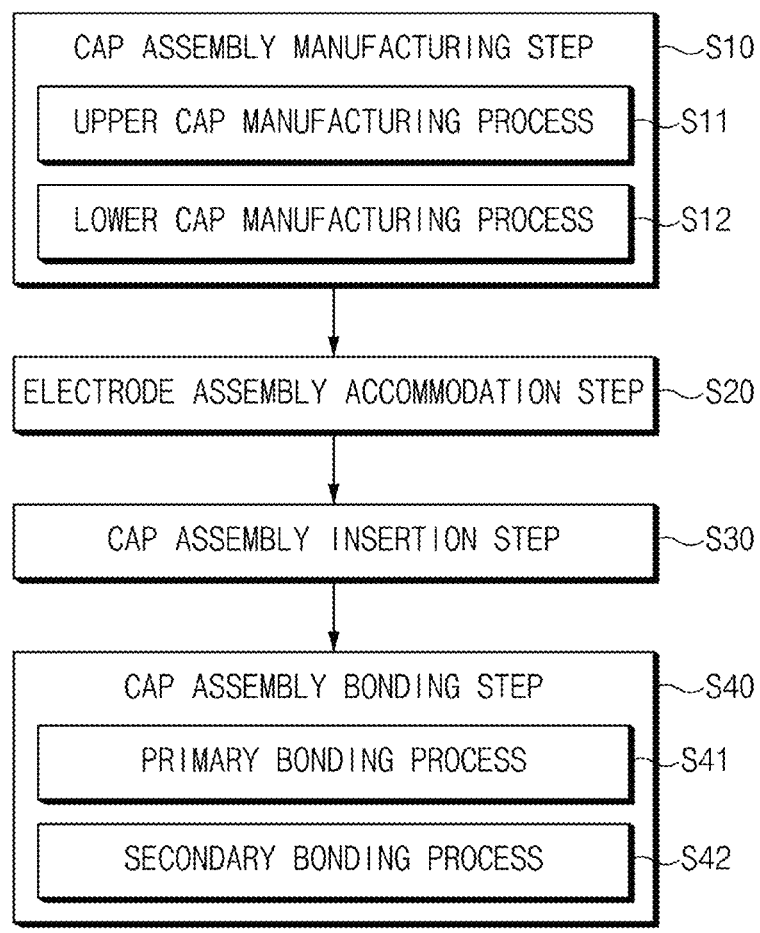
FIG. 4 is a flowchart illustrating a method for manufacturing the second battery according to the first embodiment of the present invention.

As illustrated in FIG. 4, a method for manufacturing the secondary battery according to the first embodiment of the present invention comprises a cap assembly manufacturing step (S10) of manufacturing a cap assembly 130, an electrode assembly accommodation step (S20) of accommodating an electrode assembly 120 into a can 110, a cap assembly insertion step (S30) of inserting the cap assembly 130 into an opening of the can 110, and a cap assembly bonding step (S40) of bonding the can 110 to the cap assembly 130.

The cap assembly manufacturing step (S10) comprises an upper cap manufacturing process (S11) of manufacturing an upper cap 131 and a lower cap manufacturing process (S12) of manufacturing a lower cap.

In the upper cap manufacturing process (S11), a metal plate having a predetermined size is prepared, and the prepared metal plate is punched by using a press (not shown) provided with a crimping part having the same shape as an upper cap 131 to manufacture the upper cap 131.

In the lower cap manufacturing process (S12), a lower cap 132 comprising a first bonding part 132a supporting a bottom surface of the upper cap 131, a second bonding part 132b formed on an outer circumferential surface of the first bonding part 132a to surround an outer circumferential surface of the upper cap 131, and a third bonding part 132c formed along an outer circumferential surface of the second bonding part 132b is manufactured. At this time, the lower cap 132 is made of a synthetic resin material to increase in sealing force and insulating property.

Here, in the lower cap manufacturing process (S12), a through-hole 132a-1 is further formed in the first bonding part 132a. The through-hole 132a-1 serves as a passage through which an electrode tap of the electrode assembly passes.

When the upper cap 131 and the lower cap 132 are completely manufactured, the upper cap 131 and the lower cap 132 are assembled to complete the finished cap assembly 130. Here, the bottom surface of the upper cap 131 may be in close contact with the first bonding part 132a of the lower cap 132, and the outer circumferential surface of the upper cap 131 may be in close contact with the inner circumferential surface of the second bonding part 132b of the lower cap 132 to increase in bonding force.

In the upper cap manufacturing process (S11), a bonding groove 131a is further formed in the outer circumferential surface of the upper cap 131. In the lower cap manufacturing process (S12), a bonding protrusion 132b-1 to be bonded to the bonding groove 131a is further formed. Accordingly, bonding force and sealing force between the upper cap 131 and the lower cap 132 may increase.

Here, the lower cap 132 may be easily manufactured using a mold. For example, the upper cap 131 is inserted into a mold having a molding space that has the same shape as that of the lower cap 132, and a synthetic resin solution having insulating properties and conductivity is injected into the molding space, and then, is cooled for a predetermined time. Thereafter, the lower cap 132 to which the upper cap 131 is integrally bonded may be manufactured.

In the electrode assembly accommodation step (S20), the electrode tab 121 provided in the electrode assembly passes through the through-hole 132b-1 of the lower cap 132 of the cap assembly 130 and then is connected to the upper cap 131. Thereafter, the electrode assembly 120 is accommodated in an accommodation part 111 of the can 110. The other electrode tab of the electrode assembly is connected to a bottom surface of the can 110.

In the cap assembly insertion step (S30), the cap assembly 130 is inserted into the opening 113 of the can 110. Then, the first bonding part 132a of the lower cap 132 is supported on a top surface of a beading part 112 of the can 110, the second bonding part 132b is supported on an inner circumferential surface 113 of the can 110, and the third bonding part 132c is supported on an upper end of the opening 113 of the can 110.

The cap assembly bonding step (S40) comprises a primary bonding process (S41) and a secondary bonding process (S42) performed after the primary bonding process (S41).

In the primary bonding process (S41), the outer circumferential surface of the opening 113 of the can 110 is heated by a heating device (not shown). As a result, the second bonding part 132b of the lower cap 132 supported on the opening 113 is melted to be bonded to the inner circumferential surface of the opening 113, thereby bonding the cap assembly 130 to the opening 113.

Also, the primary bonding process (S41), the third bonding part 132c is melted by heat applied to the can 110 and is bonded to the upper end of the opening 113, and thus, the cap assembly 130 may be firmly bonded to the opening 113.

In the secondary bonding process (S42), the upper cap 131 is further heated by using the heating device. As a result, the first bonding part 132a of the lower cap 132 supported by the upper cap 131 may be melted to bond the upper cap 131 to the lower cap 132, and simultaneously, the second bonding part 132b of the lower cap 132 may be melted to bond the outer circumferential surface of the upper cap 131 to the inner circumferential surface of the second bonding part 132b. When such the processes are completed, the finished secondary battery 100 may be manufactured.

Hereinafter, in descriptions of another embodiment of the present invention, the same or similar constituents as those of the above-described embodiments are denoted by the same reference numerals, and duplicated description will be omitted.

[Cap Assembly According to Second Embodiment of the Present Invention]

Figure 5:
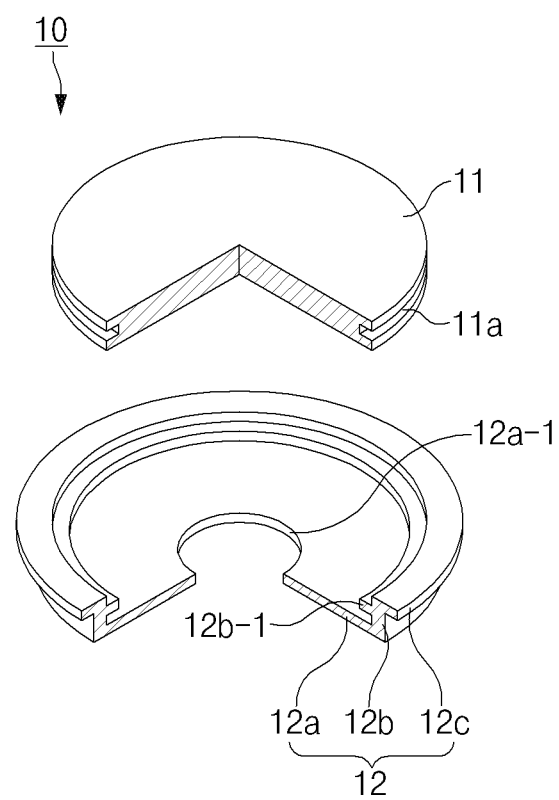
FIG. 5 is an exploded perspective view of a cap assembly according to a second embodiment of the present invention.

As illustrated in FIG. 5, a cap assembly 10 according to a second embodiment of the present invention is configured to be bonded to an opening of a can in which an electrode assembly is accommodated. The cap assembly 10 comprises an upper cap 11 provided in the opening and connected to an electrode tab of the electrode assembly and a lower cap 12 bonding the upper cap 11 to the opening.

Here, the lower cap 12 comprises a first bonding part 12a supporting the upper cap 11 while being bonded to a bottom surface of the upper cap 11 and a second bonding part 12b provided on an outer circumferential surface of the first bonding part 12a to fix the upper cap 11 while being bonded to the upper cap 11.

Also, in the lower cap 12, a bonding protrusion 12b-1 is formed on an inner circumferential surface of the second bonding part 12b. In the upper cap 11, a bonding groove 11a to be bonded to the bonding protrusion 12b-1 is formed in an inner circumferential surface thereof.

Also, in the lower cap 12, a third bonding part 12c is formed on a top surface of the second bonding part 12b. When the cap assembly and the can are bonded to each other, the third bonding part 12c is supported on an upper end of the opening of the can.

Here, the cap assembly 10 has the same configuration as the cap assembly 130 according to the foregoing first embodiment, and thus, detailed descriptions thereof will be omitted.

Therefore, the secondary battery 10 according to the second embodiment of the present invention may comprise the upper cap 11 and the lower cap 12 to simplify the structure of the cap assembly, thereby reducing the manufacturing cost and improving the manufacturing efficiency.

[Electrode Pack According to Third Embodiment of the Present Invention]

Figure 6:
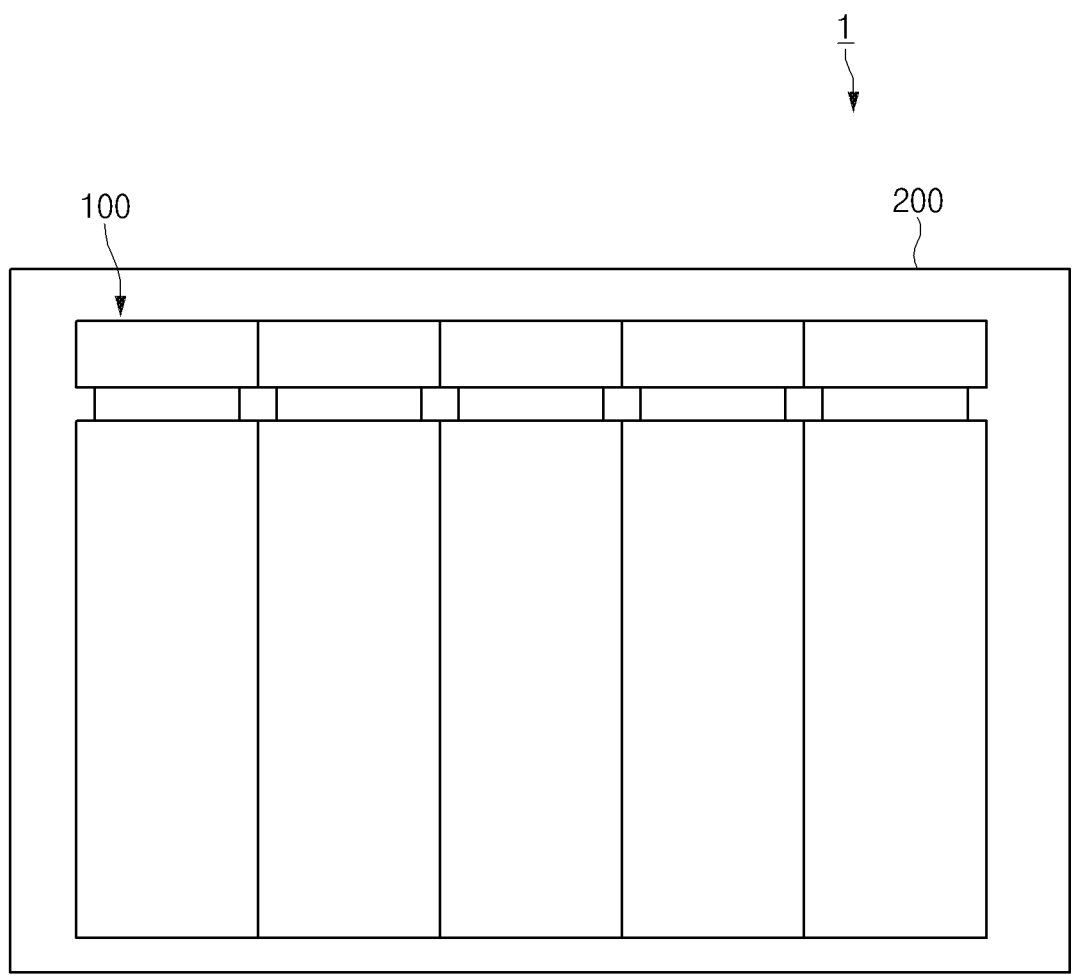
FIG. 6 is a schematic partial cross-sectional view of a battery pack according to a third embodiment of the present invention.

As illustrated in FIG. 6, a battery pack 1 according to a third embodiment of the present invention comprises the secondary battery according to the foregoing first embodiment, i.e., comprises a secondary battery 100 comprising a can accommodating an electrode assembly and a cap assembly bonded to an opening of the can and a pack case 200 accommodating one or more secondary batteries 100.

The cap assembly comprises an upper cap provided in the opening and connected to an electrode tab of the electrode assembly; and a lower cap bonding the upper cap to the opening. The lower cap comprises a first bonding part bonded to a bottom surface of the upper cap to support the upper cap and a second bonding part formed on an outer circumferential surface of the first bonding part to fix the upper cap while being bonded to the upper cap.

Here, the secondary battery 100 has the same configuration as the secondary battery according to the foregoing first embodiment, and thus duplicated descriptions thereof will be omitted.

Therefore, the battery pack 1 according to the third embodiment of the present invention comprises the secondary battery 100 comprising the cap assembly provided with the upper cap and the lower cap to simplify the structure of the secondary battery, thereby reducing the manufacturing cost and improving the manufacturing efficiency.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
a can configured to accommodate an electrode assembly, the can having an opening and a beading part; and
a cap assembly supported by a top surface of the beading part,
wherein the cap assembly comprises:
an upper cap provided in the opening and connected to an electrode tab of the electrode assembly; and
a lower cap configured to bond the upper cap to the can within the opening,
wherein the lower cap comprises:
a first bonding part bonded to the top surface of the beading part, the first bonding part supporting a bottom surface of the upper cap; and
a second bonding part formed on an outer circumferential surface of the first bonding part to fix the upper cap while being bonded to the upper cap.

2. The secondary battery of claim 1, wherein the second bonding part extends in a direction of the upper cap to surround an outer circumferential surface of the upper cap.

3. The secondary battery of claim 2, wherein the second bonding part is melted to seal a portion between the upper cap and the second bonding part or a portion between the second bonding part and the opening.

4. The secondary battery of claim 2, wherein a bonding groove is provided in the outer circumferential surface of the upper cap, and
a bonding protrusion to be bonded to the bonding groove is formed on an inner circumferential surface of the second bonding part.

5. The secondary battery of claim 4, wherein the bonding groove has a ring shape along the outer circumferential surface of the upper cap, and
the bonding protrusion has a ring shape on the inner circumferential surface of the second bonding part so as to be bonded to the bonding groove having the ring shape.

6. The secondary battery of claim 2, wherein the lower cap further comprises a third bonding part provided on a top surface of the second bonding part and bonded to an upper end of the opening.

7. The secondary battery of claim 6, wherein the third bonding part has a ring shape along an outer circumferential surface of the second bonding part so as to be bonded to an entire upper end of the opening.

8. The secondary battery of claim 1, wherein the first bonding part is melted to seal a portion between the upper cap and the first bonding part.

9. The secondary battery of claim 1, wherein the first bonding part is provided with a through-hole through which an electrode tab of the electrode assembly passes.

10. A battery pack comprising the secondary battery of claim 1.

11. A method for manufacturing a secondary battery, the method comprising:
a cap assembly manufacturing step comprising an upper cap manufacturing process of manufacturing an upper cap and a lower cap manufacturing process of manufacturing a lower cap, which is provided with a first bonding part supporting a bottom surface of the upper cap and a second bonding part formed on an outer circumferential surface of the first bonding part to surround an outer circumferential surface of the upper cap;
an electrode assembly accommodation step in which an electrode tab of an electrode assembly is connected to the upper cap by passing the electrode tab through the lower cap of the cap assembly to accommodate the electrode assembly in a can;
a cap assembly insertion step of inserting the cap assembly into an opening of the can such that the first bonding part of the lower cap engages a top surface of a beading part of the can; and
a cap assembly bonding step comprising a primary bonding process in which an outer circumferential surface of the opening of the can is heated to melt the first bonding part of the lower cap to the top surface of the beading part, and to melt the second bonding part of the lower cap to bond the cap assembly to the opening.

12. The method of claim 11, wherein the cap assembly bonding step further comprises, after the primary bonding process, a secondary bonding process comprising a process in which the upper cap is further heated, and the first bonding part of the lower cap supported on the upper cap is melted to bond the upper cap to the lower cap and a process in which the second bonding part of the lower cap is melted to bond the upper cap to the second bonding part.

13. The method of claim 12, wherein, in the lower cap manufacturing process, a third bonding part is formed and provided on a top surface of the second bonding part, and
the third bonding part is bonded to the opening while being melted by heat applied to the can during the primary bonding process.

14. The method of claim 11, wherein, in the upper cap manufacturing process, a bonding groove is further formed in an outer circumferential surface of the upper cap, and
in the lower cap manufacturing process, a bonding protrusion is further formed on an inner circumferential surface of the second bonding part so as to be bonded to the bonding groove.

15. The method of claim 11, wherein, in the lower cap manufacturing process, a through-hole through which the electrode tab of the electrode assembly passes is further formed in the first bonding part.

* * * * *